United States Patent [19]

Molinier et al.

[11] 4,244,844
[45] Jan. 13, 1981

[54] AQUEOUS SIZE FOR GLASS FIBERS

[75] Inventors: Jacques Molinier, La Motte Servolex; Jacques Mahler, Chambery; Gilbert Bocquet, Challes Les Eaux; Bernard de Massey, Chambery, all of France; Robert Holtmann, Aachen, Fed. Rep. of Germany

[73] Assignee: Saint-Gobain Industries, Neuilly-sur-Seine, France

[21] Appl. No.: 870,507

[22] Filed: Jan. 18, 1978

[30] Foreign Application Priority Data

Jan. 19, 1977 [FR] France ................... 77 01386

[51] Int. Cl.$^3$ .......................... C08L 3/08; C08L 3/12; C08L 83/08; C08L 33/26
[52] U.S. Cl. ........................ 260/9; 65/3 C; 260/17.4 ST; 260/18 S; 260/28 R; 260/28.5 R; 260/29.2 M; 525/102; 428/391
[58] Field of Search ................ 252/8.8; 260/17.4 ST, 260/9; 428/391; 65/3 C

[56] References Cited

U.S. PATENT DOCUMENTS

| | | |
|---|---|---|
| 3,097,963 | 7/1963 | Caroselli et al. |
| 3,207,623 | 9/1965 | Marzocchi et al. |
| 3,249,411 | 5/1966 | McWilliams et al. ............ 65/3 C |
| 3,252,278 | 5/1966 | Marzocchi et al. |
| 3,252,825 | 5/1966 | Marzocchi et al. |
| 3,265,516 | 8/1966 | Triplett et al. ............ 106/213 |
| 3,284,179 | 11/1966 | Eilerman ............ 65/3 C |
| 3,341,356 | 9/1967 | Collier |
| 3,734,763 | 5/1973 | Pleuddemann |
| 3,746,738 | 7/1973 | Pepe et al. ............ 260/33.2 SB |
| 3,775,074 | 11/1973 | Russell ............ 65/2 |
| 3,803,069 | 4/1974 | McWilliams et al. ............ 65/3 C |
| 3,814,592 | 6/1974 | McWilliams et al. ............ 65/3 C |
| 3,819,675 | 6/1974 | Pleuddemann ............ 260/448.8 R |
| 3,869,308 | 3/1975 | Graham ............ 65/3 C |
| 3,884,886 | 5/1975 | Pleuddemann ............ 260/448.8 R |
| 3,936,285 | 2/1976 | Maaghul ............ 65/3 C |
| 3,944,707 | 3/1976 | Foley et al. ............ 428/391 |
| 3,946,131 | 3/1976 | Biefeld et al. ............ 428/391 |
| 3,946,132 | 3/1976 | Hedden ............ 428/391 |
| 3,997,306 | 12/1976 | Hedden ............ 65/3 C |
| 4,014,726 | 3/1977 | Fargo ............ 65/3 C |
| 4,039,716 | 8/1977 | Johnson ............ 428/391 |
| 4,056,651 | 11/1977 | Scola ............ 428/391 |

FOREIGN PATENT DOCUMENTS

| | | |
|---|---|---|
| 2205523 | 5/1974 | Fed. Rep. of Germany |
| 1391278 | 1/1965 | France ............ 65/3 C |
| 2007727 | 1/1970 | France |
| 2042658 | 2/1971 | France |
| 2140130 | 1/1973 | France |
| 2148505 | 3/1973 | France |
| 2167771 | 8/1973 | France |
| 2187713 | 1/1974 | France |
| 2259127 | 8/1975 | France |
| 2285352 | 4/1976 | France |
| 2286800 | 4/1976 | France |
| 1346270 | 2/1974 | United Kingdom |
| 1364965 | 8/1974 | United Kingdom |

Primary Examiner—Wilbert J. Briggs, Sr.
Assistant Examiner—Arthur H. Koeckert
Attorney, Agent, or Firm—John T. Synnestvedt

[57] ABSTRACT

Aqueous compositions for the coating of glass fibers used particularly for textiles, a method of applying these compositions to the fibers, and the fibers themselves are disclosed. The aqueous compositions comprise at least one starch, a non-ionic lubricant, a cationic lubricant, emulsifier and at least one organo-silane from the group made up of the organo-silanes comprising an organic chain of the polyazamide type and of the organo-silanes whose organic chain contains at least one phenyl radical and at least one secondary or tertiary amine group.

7 Claims, No Drawings

AQUEOUS SIZE FOR GLASS FIBERS

The present invention concerns aqueous compositions for the coating of glass fibers used particularly for textiles. It also concerns both a method for manufacturing glass fibers having great tensile strength, by which method the aforementioned aqueous compositions are applied to the fibers, and the finished fibers.

The glass fibers are manufactured in a known manner by the attentuation of molten glass threads flowing from die orifices. These glass threads are thinned down in order to form continuous filaments by means of an attenuation brought about by having these filaments rolled on a support on a winder turning at great speed, before which rolling, however, the filaments are gathered in the form of a strand. Before being gathered in the form of a strand, the filaments are coated with a sizing by being passed onto a continuously fed sizing component.

The sizing is applied in order to prevent the mutual abrasion and the rupture of the individual filaments when the strand is submitted to a certain number of transformations during its formation or during its utilization. Particularly, in order that the strand can withstand friction during its speedy passage through guide components during various textile operations, such as twisting, cabling, warping, pirn winding or weaving, it must be coated with a sizing having protective and lubricating properties. The sizing also provides for the adhesion or sufficiently strong cohesion of the individual filaments to provide an integer strand. The properties providing protection against abrasion and providing for integrity are essential when the strand must be submitted to all the operations and textile transformations previously mentioned.

From another angle, where the strands or webs are used for the reenforcement of plastic materials, the sizing must be compatible with the matrices to be reenforced and must improve the adhesion of the strands to these matrices so that laminations with good mechanical and dielectrical properties are obtained.

Generally the sizing is a solution or an aqueous dispersion composed essentially of: one or several adhesive or film forming agents, contributing to the integrity of the strands; lubricants, for protecting the filaments and strands against abrasion; and possibly binding agents favoring adhesion of the filaments to plastic matrices.

Various additives, such as products stabilizing the emulsions, antistatic products, fungicides or softening agents, can also be added to these sizing compositions, depending on the ultimate range of application of the strands.

The present invention relates particularly to sizings permitting the fabrication of strands capable of supporting the substantial tensions to which they are submitted during their transformations or ultimate applications, such as twisting, cabling, sectional warping, pirn winding or weaving. These sizings are conducive to strands with firm integrity and allow for a considerable reduction in the number of filament breakages, which in turn improves the yields during the aforesaid operations and transformations.

The invention relates to compositions containing, in addition to starch and the constituents usually used for coating glass fibers, at least one component from an organo-silane family, the formula for which is given hereafter in the description and one particular characteristic of which is that it considerably increases the tensile strength of the strands without affecting their other properties and, particularly, their behavior during textile operations.

It is well known to use aqueous sizings for coating glass fibers which contain:
adhesive agents such as polyvinyl acetate, acrylic resins, polyesters, epoxy resins, polyurethanes;
lubricating agents;
and components of the organo-silane type. The purpose of these fibers thus generally is to reenforce plastic materials; in this context the organo-silanes serve as binding or bridging agents between the glass and the organic resins by assuring in this manner compatibility of the fibers with the resins to be reenforced. However, the organo-silanes used most often in these sizings, such as γ-aminopropyltriethoxysilane, vinyltriacetoxysilane, N-β-amino-ethyl γ-amino-propyltrimethoxysilane, γ-methacryloxypropyl-trimethoxysilane, phenyltrimethoxysilane, vinyl-tri-(β-methoxyethoxysilane), practically do not improve the tensile strength of the sized strands and provide only the property of adhesion to the matrices to be reenforced. This is also the case for other organo-silanes from prior art more rarely used such as polyaminopropyltrimethoxysilane or β (3,4-epoxy cyclohexyl)ethyltrimethoxysilane, or para-aminophenyltrihydroxysilane. In addition, when the strands coated with these known sizings are first woven in order to be used in the form of webbing for reenforcing plastic materials, the various organo-silanes incorporated do not allow for obtaining strands possessing integrity, sliding ability and tensile strength which is strong enough for the twisting, winding on a warp beam and weaving operations to be carried out without filament breakage or without other difficulties. These difficulties considerably decrease the yields from the operation.

For this same application, the publication of French Pat. No. 2 259 127 also proposed aqueous sizings containing a partially baked starch, a parafin wax, an emulsifier, a cationic lubricant and an organo-silane of the formula:

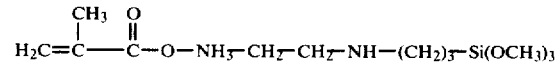

However, the preceding composition seems to be the only one capable of obtaining strands conducive to satisfactory results during textile operations. In fact it is stated specifically that the replacement of this organo-silane with another silane such as γ-methacryloxypropyltrimethoxysilane totally spoils the capability of the strands to withstand textile operations. Also, the addition of this component of the organo-silane type in sizings does not seem to result in an improvement of the tensile strength of the strands contrary to the use of the particularly active organo-silanes proposed by the present invention.

Respecting the starch base sizings for strands specifically for textiles subsequently submitted to the various textile operations of twisting, cabling, warping, pirn winding, weaving and desizing, the prior art compositions essentially contain starch, a non-ionic lubricant, such as an oil or a wax and an emulsifier and a cationic lubricant, but do not usually contain components of the organo-silane type. In fact, it may be noted that, generally speaking, these components are detrimental to the textile operations because they may be the originators of filament rupturing, the presence of hairs, or the tangling of the strands. Moreover, for these sizings for "textile strands", the addition of organo-silanes, the essential function of which is to assure the adhesion of glass with a synthetic resin, bears no particular interest since the webs must be desized before being finished and used for as decorative fabrics or reinforcement of high performance laminations (with very strict dielectric limits).

According to the present invention, the addition of one or several specific silanes, constituting the group defined hereafter, to the sizing compositions for glass fibers surprisingly improves the tensile strength of the sized strands, that is the values for resistance to breakage by pulling, by between 20% and 60%, depending on the types of strands and the components of the sizing without detracting from the other properties of these strands.

The aqueous compositions which are objects of the invention essentially contain the following elements, whose rates are expressed, throughout the whole of the description, in weight portions of active materials per 100 parts of the total:

0.5 to 15% of at least one starch;
0.05 to 5% of non-ionic lubricant;
0.03 to 2% of a cationic lubricant;
0.02 to 1% of an emulsifier;
0.1 to 2% of at least one organo-silane from the group made up of the organo-silanes comprising an organic chain of the polyazamide type and of the organo-silanes whose organic chain contains at least one phenyl radical and at least one secondary or tertiary amine group;
0 to 7% of at least one supplementary film forming material;
0 to 1% of another organo-silane;
complement: demineralized water The organo silanes with an organic chain of the proposed polyazamide type are of the following formulas:

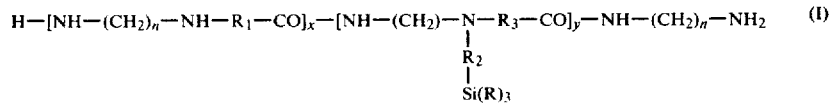

in which:
x/y is 0.5 to 15; n is 2 to 6 and preferably n=2 or 3.
R is a methoxy, ethoxy, propoxy, n-butoxy or β-methoxyethoxy radical.
$R_1$ and $R_3$ are alkylene divalent radicals containing 1 to 3 carbon atoms.
$R_2$ is a substituted or non-substituted cycloaliphatic divalent radical.

The various methods for fabricating these compositions, the nature of the radicals and the values of x and y as a function of the method used are specifically described in U.S. Pat. No. 3,746,738.

Organo-silanes whose organic chain includes one phenyl radical and at least one secondary or tertiary amine grouping causing a particularly important improvement in the tensile strength of the sized strands are of the following formulas:

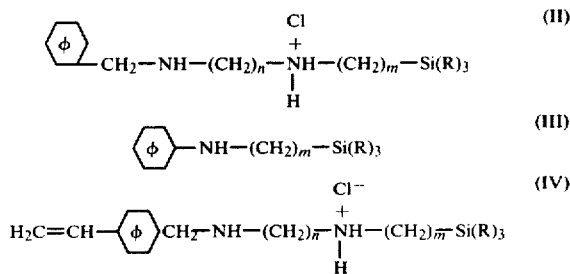

in which:
n is 2 to 6, preferably n=2 or 3
m is 1 to 10, preferably m is 1 to 4
R is a methoxy, ethoxy, propoxy, n-butoxy or β-methoxyethoxy radical.

The unexpected gain in the tensile strength of the strands with the addition of at least one of the proposed organo-silanes is obtained independently of the constituents forming the base of the sizing, despite the different nature of these constituents, which depend on the ultimate use of the strands. On the other hand, there is no bad effect on such properties as strand integrity, appearance of the strands, their adhesion to the matrices to be reenforced, their resistance to abrasion or their ability to withstand the ultimate operations or textile transformations—properties which naturally vary depending on the various sizing compositions used.

With respect to the above, there is a considerable and surprising advantage which proves to be particularly interesting when the strands are to be submitted to very substantial strains and tensions, particularly in the course of textile transformation operations. It has been observed, in fact, that the strands sized with the compositions which are objects of the invention withstand these operations with a decrease in the number of filament breakages, of the quantity of hairs, and of the tanglings of the strands during their passage through guide components. This reduction in the number of breaks during twisting, cabling or weaving allows for faster operations, consequently resulting in an improvement in yields. These improvements also result in webs with better appearance and possessing, as do the strands or assemblies of strands which are used for their construction, higher tensile strength.

From another angle, for sizings for strands whose application includes a further desizing, the presence of the organo-silanes does not increase the difficulty of the desizing step.

Another characteristic of the invention presenting particularly surprising results consists of combining, in sizing formulas with a starch base, at least one of the silanes which are objects of the invention with another organo-silane usually used as an organic glass resin binding agent for the reenforcement of plastic materials. In fact, although these binding agents are generally detrimental to the ability of the strands to withstand textile operations, Applicants have found that their introduction in the form of this combination does not cause this detrimental effect and maintains the advantages of the greater tensile strengths.

Among all the sizing compositions conducive to sized strands possessing in particular high tensile strength, a good ability to withstand textile operations and having to be further desized, the combination of the sizing constituents described in French Pat. No. 76 15887 filed May 26, 1976, with at least one organo-silane having the previously indicated chemical formula, represents a preferred form of the invention.

The sizing compositions used (expressed in parts in weight per 100 parts of aqueous solution) are the following:

|  | % of active materials | |
|---|---|---|
| modified starch | 0.5 to | 10% |
| acrylic polymer | 0.1 to | 5% |
| mineral oil with emulsifier | 1 to | 5% |
| polyethylene wax | 0.2 to | 2% |
| cationic emulsifier of polyethylene wax | 0.03 to | 0.6% |
| organo-silane with an organic chain containing a phenyl radical and at least one secondary or tertiary amine group | 0.1 to | 2% |
| other organo-silane | 0 to | 1% |
| demineralized water | | to 100 |

These compositions are particularly interesting because they possess all the characteristics and advantages described in the above application and because they not only allow for obtaining a uniform and regular distribution of the sizing on the strand, a low rate of migration, excellent unity of the strand and complete and rapid desizing but also effect, in addition, an improvement of about 20% to 60% in tensile strength.

Another form of the invention comprises sizings with a non-modified starch base or a mixture of non-modified starch and substituted starch according to the weight composition hereafter:

|  | % of active materials | |
|---|---|---|
| starch high in amylose | 2 to | 8% |
| cationic starch | 0.2 to | 1% |
| hydrogenated vegetable oil | 0.10 to | 5% |
| emulsifier | 0.02 to | 1% |
| cationic lubricant | 0.05 to | 2% |
| softening agent | 0 to | 0.3% |
| supplementary film forming material | 0 to | 5% |
| organo-silane with an organic chain of the polyazamide type or with an organic chain containing a phenyl radical and at least one substituted amine group | 0.1 to | 2% |
| other organo-silane | 0 to | 1% |
| demineralized water | | to 100 |

It is quite possible to cite a large number of other currently used sizing formulas for textile glass fibers in which the addition of the organo-silanes according to the present invention has the effect of substantially increasing the tensile strength of the sized strands.

Among the non-ionic lubricants generally used in the compositions, those that may be mentioned are, for example, waxes or natural or synthetic oils, (animal, mineral or vegetables), polyethylene emulsions, and non-ionic derivatives of polyethyleneglycol. Most often used as cationic lubricants are condensates of fatty acids on polyethoxylated amino alcohols, or amine derivatives of fatty bodies.

Adding organo-silanes, as defined in this invention, to the sizings in proportions going beyond the upper limit of 2% in weight brings no further improvement with respect to tensile strength, and can cause either a substantial modification of the stiffness of these strands, or a decrease of the protection of the strand, causing the appearance of broken filaments during the ultimate transformation operations.

Of course, the use of these organo-silanes for oversizing or coating strands having previously received a standard sizing from a die presents similar advantages.

In the following examples relating to a few of the embodiments demonstrating certain advantages of the invention, the tensile strength of the strands has been expressed independently of the area or of the size of these strands, that is in the form of values for the resistance to rupture by pulling. Each value corresponds to a mean established from several tests.

EXAMPLE 1

A sizing is prepared using the components forming the basis of example 1 in French Pat. No. 76 15887 mentioned, but a preliminarily hydrolyzed organo-silane encompassing a polyazamide type of chain is introduced into the composition. This organo-silane has the general formula (I) in which:

x/y=0.92; R=methoxy radical; n=2 $R_1=R_3=$ethylene radical $R_2=$hydroxy-cyclohexyl-ethylene, the cyclohexyl radical being tied to the nitrogen and the ethylene to the silicon atom.

This sizing contains the following components (whose quantities are expressed in parts by weight per 100 parts of sizing):

|  | | % active materials |
|---|---|---|
| corn starch with 26% amylose liquified by acid and etherified by propylene oxide (containing 0.035 ether grouping per anhydroglucose grouping) | | 3.90 |
| acrylonitrile, acrylamide and acrylic acid, acrylic copolymer in the respective proportions of 40%, 55%, 5% | | 0.36 |
| emulsifiable vaseline oil | | 1.83 |
| containing | 80% by weight of vaseline oil (viscosity 3° Engler at 20° C.) −20% in weight of emulsifier: product of the condensation of stearylamine with eight ethylene oxyde molecules | |
| cationic aqueous emulsion with polyethylene 25% of active materials | | 1.73 |
| containing | −20% by weight of polyethylene fusion point = 115° C., density = 0.93 (norm ASTM D 1505), high molecular weight, viscosity at 140° C. = 200 cPo −5% by weight of cationic emulsifier: amine quaternized with chain length of from 12 to 16 carbon atoms containing essential dimethyl-lauryl ammonium | |
| organo-silane with an organic chain of the polyazamide type : Y 5987 (Union Carbide) of the preceding formula | | 0.15 |
| demineralized water | to 100 | |

The starch suspension is first prepared in a tank by the addition of the starch to ⅓ of the total volume of demineralized water which has been brought to 40° C.; it is then thermally treated in a continuous oven with the injection of steam at a temperature of 95° C. for 25 seconds, the condition corresponding to a total bursting of the starch granules. The viscosity of the obtained paste is on the order of 10 cPo with an 8% concentration at 90° C.

In a second tank, the acrylic copolymer, neutralized to pH=7 by a equimolecular mixture of triethanolamine and sodium hydroxyde, is added to around 1/10 of the total volume of demineralized water brought to 75° C. This is agitated until a clear and transparent liquid is obtained, then cooled by the addition of demineralized water until the temperature is 40° C.

The acrylic copolymer used in this example is totally soluble in water; in solution it has a pH of 7 and at a 20% concentration, a viscosity of 45,000 cPo at 22° C. measured by the Brookfield viscosimeter, type L.V.F., speed 10, module 6. A 2% solution has a viscosity of 6.5 cPo at 22° C.

The starch paste coming out of the oven is continuously introduced into the acrylic copolymer solution and the entire solution is cooled to 40° C.

Elsewhere, in a third tank, an emulsion of the lubricants is formed using 1/10 of the total volume of demineralized water and by successively adding, under moderate agitation, mineral oil containing emulsifier, then the cationic emulsion of polyethylene wax. At the end of preparation, the mixture of the lubricants in emulsion has a pH of 7.4 and a temperature of 23° C.; it is introduced into the bath already containing the starch paste and the acrylic copolymer.

In another bath, the organo-silane is added to 1/20 of the total volume of water at around 18° C. with a pH that has been adjusted to 3.5 by acetic acid. The agitation is maintained until the hydrolysis of the silane is complete. The product is thus transferred into the bath already containing the mixture of starch, acrylic copolymer and lubricants. After the addition of the remainder of the water, the pH is adjusted to 7.2 and the temperature controlled at 35° C., a temperature which is maintained both for holding the sizing and during application.

The resulting sizing has a viscosity of 10 cPo at 35° C. and a dry extract of 5.6% by weight, measured after evaporation at 82° C. for 1 hour and then drying for 10 minutes at 105° C. This sizing is applied at a temperature of 35° C. during the fiberization of standard glass by means of sizing apparatus of the type apron applicator. In this example, the strands are formed from 9 micron filaments and rolled on their supports during the fiberization operation in order to form reels called "cakes". The quantity of dry sizing deposited on the strand is determined by loss by burning at 625° C. until there is a constant weight. The first 1,000 meters of strand at the exterior of the cakes presents a dry sizing rate above 0.80% of the weight of the strand and are not used for the final operations, while the rest of the strand possesses a very regular dry sizing rate of 0.75% ±0.05%. The strand is then submitted to a first twisting of 40 turns per meter and the tensile strength is measured in the standard way by the method described by the B.I.S.-F.A. (International Bureau for the Standardization of Rayon and Synthetic Fibers). The simple strands, having undergone a twisting of 20 or 40 turns per meter have a tensile strength of 169 kgf/mm².

Control Example T₁

In order to show the increase in tensile strength with the addition of organo-silane, a sizing prepared as described above but not containing organo-silane Y 5987 is applied in the same manner to 9 μm filaments. The resulting strand possesses a dry sizing rate of 0.74%, that is a rate very near that of example 1, and there is obtained, after the strand has undergone an identical twisting of 20 to 40 turns per meter, a tensile strength of 131 kgf/mm².

Therefore it may be concluded from the comparison of these results that the introduction in the composition of the organo-silane Y 5987 in a hydrolyzed form increases by 29% the tensile strength of the simple strands.

The comparison of the sized strands shows that the strand with the sizing containing the hydrolyzed organo-silane Y 5987 possesses an improved integrity as compared with the strand coated the sizing of example T₁, which appears to be attributable to the film forming qualities of this organo-silane.

On the other hand, it is interesting to note that the suitability for the textile operations of warping, pirn winding, and weaving is not completely destroyed with the addition of this organo-silane, contrary to what might be concluded with respect to other organo-silanes such as those employed in example 12 herebelow.

EXAMPLE 2

A sizing is prepared in which the same components are introduced as in example 1 and in the identical proportions, but the organo-silane Y 5987 is replaced by 0.20% in weight of an organo-silane containing a phenyl radical and two substituted amine groupings of the general formula (IV) in which:

R is a methoxy radical, n=2, m=3

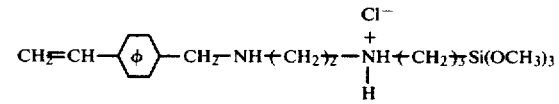

The sizing is prepared and applied, according to the same method and the same operatory conditions as those in example 1, to 9 μm filaments. The mean dry sizing rate on the strand is 0.78% and the tensile strength obtained with the strand having undergone a first twisting of 20 or 40 turns per meter has a value of 180 kgf/mm². The gain in tensile strength as compared to the same sizing without organo-silane (example T₁) here represents 37% and the textile operations of warping and weaving are carried out without any difficulty. It is noted, however, that this organo-silane does not improve the integrity of the strands, contrary to the results in example 1.

EXAMPLE 3

In the sizing composition of example 1, the organo-silane is replaced with 0.15% of an organo-silane of formula (II) with R=methoxy radical, n=2, m=3:

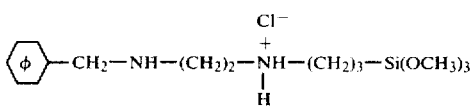

The method for preparing the sizing is the same as that in example 1. The composition presents a dry extract of 4.93% and the quantity of dry sizing deposited on the strand represents 0.65% of the weight of the strand. The tensile strength of the simple strand is raised to 195 kgf/mm$^2$, by which there is noted a gain of 49% as compared with the same sizing without organo-silane (example $T_1$). The textile operations are carried out with this strand without any difficulty, without rupture of the filaments nor tangling of the strand layers.

EXAMPLE 4

A sizing is prepared and applied which is of the same type as that of example 1 but includes 0.15% of an organo-silane of the formula (III) in which R is a methoxy group and m=3, that is:

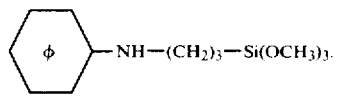

The quantity of dry sizing deposited on the strands with 9 μm filaments is 0.70% and the tensile strength of the simple strand, having undergone a twisting of 20 or 40 turns per meter, has a value of 165 kgf/mm$^2$. In this case a gain of 26% in tensile strength is obtained as compared with the strand sized with the composition of example $T_1$. The final textile transformation operations take place quite normally, without tangling of the strands or rupture of the filaments, and very satisfactory webs are obtained.

EXAMPLES 5 and 6

In the sizing composition for textile strands from example 1, the organo-silane with an organic chain of the polyazamide type (Y 5987) is replaced with 0.15% of an organo-silane with a smaller molecular weight, whose polyazamide organic chain responds to the general formula (I) in which:

x/y = 8.86; R = methoxy radical; n = 2
$R_1 = R_3$ = ethylene radical,
$R_2$ = hydroxycyclohexyl-ethylene, the cyclohexyl radical being tied to the nitrogen and the ethylene to the silicon atom.

With this organo-silane, sold on the market as Y 5986, Union Carbide, a gain of 21% in the tensile strength is obtained, this strength being raised to 158 kgf/mm$^2$ for a simple strand having a dry sizing rate of 0.72%.

An equivalent gain in the tensile strength as compared with example $T_1$ is also reached by using, under the same conditions (that is in a hydrolyzed form), 0.15% of a cationic organo-silane, Y 5922 (Union Carbide), with a polyazamide chain responding to the following characteristics:

x/y = 9.25; R = methoxy radical, n = 2.
$R_1 = R_3$ = ethylene radical
$R_2$ = propylene radical

EXAMPLE 7

This example relates to a sizing for strands to be used specifically for textile applications and which contains the usual adhesive agents, lubricants and emulsifiers and encompasses, in addition, an organo-silane whose organic chain includes a phenyl radical and two secondary amine groups, one of which is in the form of hydrochloride salt. The sizing has the following composition:

| | % of active materials |
|---|---|
| hybrid corn starch with 60% amylose | 3.81 |
| cationic derivative of corn starch high in amylose | 0.42 |
| vegetable oil: hydrogenated corn oil | 1.27 |
| emulsifier: monooleate of sorbitan polyoxyethylene | 0.13 |
| cationic lubricant: product of the condensation of pentamine tetraethylene with stearic acid solubilized by acetic acid | 0.21 |
| polyethylene glycol, molecular weight = 300 | 0.13 |
| softening agent: nonylphenol polyoxyethylenated (with 9 moles of ethylene oxide) | 0.02 |
| organo-silane of formula (IV) with R = methoxy, n = 2, m = 3.  | 0.20 |
| tin tributyl oxide (fungicide) | 0.01 |
| demineralized water   to 100 | |

To prepare this sizing the starches are dispersed in water and preheated to 80° C. for the preliminary swelling of the starch granules. Then the mixture is baked in a steam oven fed by steam at a pressure of around 7 bars and the temperature upon exit is regulated at about 100° C; under these conditions, there exists a certain portion of incompletely bursted starch granules. The polyethylene glycol and the cationic lubricant, after dilution, are directly introduced into the baked and cooled starch mixture. Another emulsion, consisting of vegetable oil in the presence of a softening agent and of an emulsifier, heated to around 70° C., is prepared by the introduction of water and by violent agitation of the solution until there is a phase inversion after passing through a cone homogenizer. The emulsion is then added to the principal mixture and to the fungicide.

In a separate tank, an organo-silane is diluted with demineralized water until a concentration is obtained which is below 3% and agitation is kept up until there is complete hydrolysis of this silane. The product brought to pH=4.5, is then introduced into the preceding principal mixture and the preparation is brought to its final volume with the addition of the remaining water. The sizing, adjusted to pH=4.75, must be kept at a temperature of 65° C.

The sizing thus obtained presents a dry extract of 6%; it is applied to the gum filaments at 65° C. during fiberization.

The quantity of dry sizing deposited on the strand rises to 1.50% of the weight of the strand. After twisting the strand shows a tensile strength of 192 kgf/mm$^2$.

Control Example T$_2$

For a comparison, the same sizing is prepared but without the organo-silane type of component, and this sizing is applied to the filaments under the same conditions in order to form strands identical in yardage.

The resulting strands have a mean dry sizing rate of 1.4% in weight and display a tensile strength of 131 kgf/mm$^2$ after a first twisting.

It may be concluded, therefore, that there is a considerable gain in the tensile strength, reaching 47% as compared with example T$_2$, which results in noticeable decreases in the number of breaks of the filaments or of the strands in the final textile operations.

EXAMPLE 8

While using the same operating conditions as in the preceding example, a sizing is prepared having the following composition:

|  | % of active materials |
| --- | --- |
| hybrid corn starch with 60% amylose | 3.81 |
| cationic derivative of corn starch high in amylose | 0.42 |
| acrylonitrile, acrylamid and acrylic acid, acrylic copolymer in the respective proportions of 40%, 55%, 5% | 0.42 |
| hydrogenated corn oil | 0.50 |
| emulsifier: sorbitan polyoxyethylene monooleate | 0.13 |
| cationic lubricant: product of the condensation of tetraethylene pentamine with stearic acid solubilized with acetic acid | 0.21 |
| polyethylene glycol, molecular weight = 300 | 0.13 |
| softening agent: nonylphenol polyoxyethylene with 9 moles ethylene oxide | 0.02 |
| organo-silane of formula (II) with R = methoxy, n = 2, m = 3: $$\langle\phi\rangle-CH_2-NH-\overset{+}{\underset{\underset{H}{\mid}}{N}H}-(CH_2)_3-Si(OCH_3)_3 \quad Cl^-$$ | 0.15 |
| demineralized water | to 100 |

The acrylic copolymer, neutralized to pH=7 by an equimolecular mixture of triethanolamine and sodium hydroxide, is introduced into the demineralized water brought to 75° C. in order to form a 10% solution. After agitation to a point when a clear and transparent liquid is obtained, it is cooled with the addition of water until the temperature is 65° C. The copolymer in solution is then added to the starch mixture, baked and cooled as in example 7, before the addition of the polyethylene glycol and other components.

This sizing has a dry extract rate of 4.69%. It is applied at a temperature of 65° C. during the fiberization operation and, thus, strands are obtained with a sizing rate of 1.53%. The strands display, after a twisting of 20 to 40 turns per meter, a tensile strength of 195 kgf/mm$^2$.

EXAMPLE 9

The organo-silane in example 8 is replaced with 0.15% of an organo-silane with a chain of the polyazamide (Y 5987 Union Carbide) type. The sizing applied at a temperature of 65° C. results in strands possessing a dry sizing rate of 1.50% in weight. These strands, after twisting of 20 or 40 turns per meter, have a tensile strength of 171 kgf/mm$^2$.

The strands sized with this composition have a better appearance than those in example 8, probably because of the improvement in their integrity brought about by the presence of organo-silane Y 5987. The final textile operations are carried out without any rupture of the strands, thus leading to better fabrication yields.

EXAMPLE 10

|  | % of active materials |
| --- | --- |
| hybrid corn starch with 60% amylose | 3.81 |
| cationic derivative of corn starch high in amylose | 0.42 |
| acrylonitrile, acrylamide and acrylic acid copolymer in the respective proportions of 40%, 55%, 5% | 0.30 |
| hydrogenated corn oil | 1.27 |
| emulsifier: sorbitan polyoxyethylene monooleate | 0.13 |
| cationic lubricant: product of the condensation of tetraethylene pentamine with stearic acid solubilized by acetic acid | 0.21 |
| polyethylene glycol, molecular weight = 300 | 0.13 |
| softening agent: polyoxyethylenated nonylphenol with 9 moles of ethylene oxide | 0.02 |
| organo-silanes: | |
| glycidyl-oxypropyl-trimethoxysilane | 0.10 |
| silane with a polyazamide organic chain Y 5987 (Union Carbide) | 0.10 |

This sizing composition is obtained under the same conditions as those for the sizings in examples 8 and 9 which only contain a single organo-silane. The two organo-silanes are introduced one after the other, after hydrolysis, into a mixture already containing the other products.

The final composition is applied to the 9 μm filaments at a temperature of 65° C. during the fiberization operation. The dry sizing rate on the strands formed by the union of the filaments is 1.40%, and after a first twisting of 40 turns per meter, these strands possess a tensile strength of 176 kgf/mm$^2$. As compared with strands sized with a similar composition not including organo-silane, the tensile strength is improved by 34%.

Respecting the textile operations, it is noted that the presence of these two silanes in combination in the sizing composition further facilitates warping.

EXAMPLE 11

A sizing composition is prepared which is similar to that in example 7 and according to the same method and with the same operating conditions, but the organo-silane is replaced with the following mixture of two organo-silanes:

0.10% of glycidyl-oxypropyl-trimethoxysilane
0.10% of N-vinyl-toluyl-ethylene-diamine-propyl-trimethoxysilane (formula (IV):

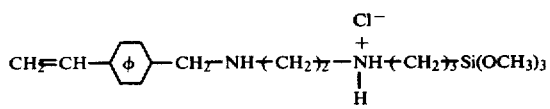

The strands have a dry sizing rate of 1.41% of the weight of the strand and the tensile strength reaches 190 kgf/mm$^2$, which represents a gain of 45% as compared with the strands coated with the same sizing not containing this organo-silane, that is the composition of example T$_2$. The strands sized with this composition behave as satisfactorily during the standard textile operations as they do in example 7.

This result is surprising because it was noted elsewhere that the use in this composition of γ-glycidoxypropyl-trimthoxysilane alone has a tendency to degrade the ability of the strand to withstand the textile operations. On the contrary, this example shows that this detrimental effect is nullified by the presence of 0.1% of N-vinyl-toluyl-ethylene-diamine-propyl-trimethoxysilane which carries with it the strong tensile strength value.

EXAMPLE 12

In the sizing from example 1 the organo-silane is replaced with 0.15% of an organo-silane of the formula:

This organo-silane is used in the prior art in compositions with a starch base for the coating of glass fibers to be used for reenforcing plastic material in the form of webs such as described in the French Pat. No. 2,259,127.

The sizing is applied at 35° C. and a strand is obtained having a dry sizing rate of 0.70%. After twisting, it is noted that the tensile strength of the strands only reached 100 kgf/mm$^2$, a value below that obtained with the same sizing not containing organo-silane (example T$_1$).

This example shows that the addition of organo-silanes to the sizing compositions for glass fibers to be used specifically for textile applications can decrease the tensile strength of the strands. This decrease seems to result probably from a degradation by the organo-silane of the integrity of the strand and of the protection against abrasion. The same phenomenon of destruction of the textile properties can also be observed when, in the sizing from example 1, in place of the organo-silane used, is introduced 0.15% of γaminopropyl-triethoxysilane well known in the technique for sizings for the reenforcement of plastic materials.

We claim:

1. Aqueous composition for the coating of glass fibers, characterized in that it comprises:
   0.5 to 15% in weight of at least one starch,
   0.05 to 5% of non-ionic lubricant,
   0.03 to 2% of cationic lubricant,
   0.02 to 1% of emulsifier,
   0.1 to 2% of at least one organo silane selected from the group consisting of

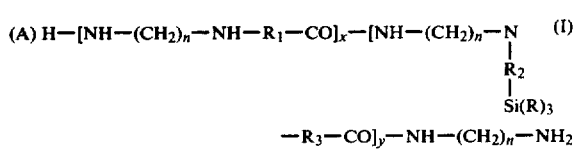

in which:
   x/y is 0.5 to 15; n is 2 to 6,
   R is a methoxy, ethoxy, propoxy, n-butoxy or β-methoxyethoxy radical,
   R$_1$ and R$_3$ are alkylene divalent radicals containing 1 to 3 carbon atoms, and
   R$_2$ represents a substituted or non-substituted cycloaliphatic or aromatic, aliphatic divalent radical; or

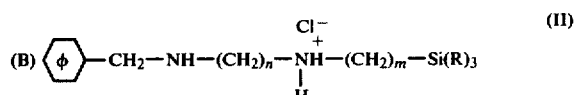

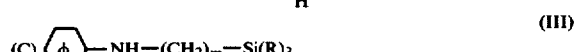

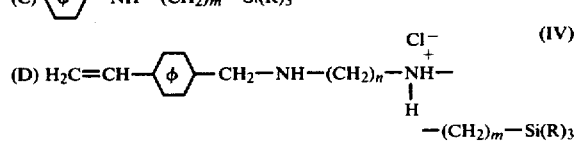

in which:
   n is 2 to 6, preferably n=2 or 3
   m is 1 to 10, preferably m is 1 to 4
   R is a methoxy, ethoxy, propoxy, n-butoxy or β-methoxyethoxy radical.

2. Aqueous sizing for the coating of glass fibers according to claim 1, characterized in that it contains up to 7% of supplementary film forming materials and/or up to 1% of another organo-silane.

3. Aqueous sizing according to claim 1, characterized in that it comprises:
   0.5 to 10% in weight of modified starch,
   0.1 to 5% of acrylic polymer,
   1 to 5% of emulsified, non-ionic lubricant(s),
   0.2 to 2% of polyethylene wax,
   0.03 to 0.6% of a cationic emulsifier for polyethylene wax,
   0.1 to 2% of the organo-silane.

4. Aqueous sizing according to claim 1, characterized in that the at least one organo-silane is selected from the general formulas II and IV.

5. Aqueous sizing for coating glass fibers according to claim 1, characterized in that it contains at least one of the organo-silanes of the following formulas:

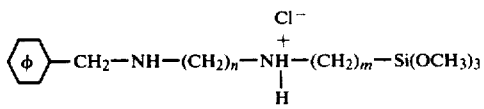

-continued

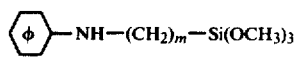

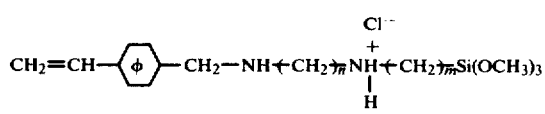

in which n equals 2 or 3, m is 1 to 4.

6. Aqueous composition for the coating of glass fibers according to claim 1, characterized in that it contains at least one organo-silane of the general formulas:

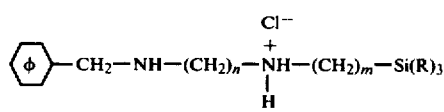 (II)

in which n is 2 to 6, m is 1 to 10,

R is a methoxy, ethoxy, propoxy, n-butoxy or β-methoxyethoxy radical,

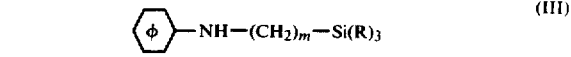 (III)

in which:

m is 1 to 10,

R is a methoxy, ethoxy, propoxy, n-butoxy or β-methoxyethoxy radical,

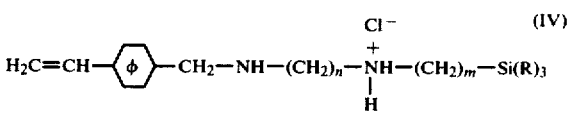 (IV)

in which:

n is 2 to 6, m is 1 to 10,

R is a methoxy, ethoxy, propoxy, n-butoxy or β-methoxyethoxy radical.

7. Aqueous sizing according to claim 1, characterized in that it comprises:

0.5 to 10% in weight of modified starch,
0.1 to 5% of acrylic polymer,
1 to 5% of emulsified, non-ionic lubricants(s),
0.2 to 2% of polyethylene wax,
0.03 to 0.6% of a cationic emulsifier for polyethylene wax,
0.1 to 2% of at least one organo-silane of the general formulas (II), (III), and (IV).

* * * * *